United States Patent [19]
Erickson

[11] 3,817,547
[45] June 18, 1974

[54] LAWN MOWER HANDLE MOUNTING

[75] Inventor: Donald G. Erickson, Racine, Wis.

[73] Assignee: Jacobsen Manufacturing Company, Racine, Wis.

[22] Filed: Jan. 11, 1973

[21] Appl. No.: 322,890

[52] U.S. Cl. .......................................... 280/47.37
[51] Int. Cl. ............................................. B62b 3/00
[58] Field of Search.... 280/47.37; 16/110 R, 111 R, 16/113

[56] References Cited
UNITED STATES PATENTS

| | | | |
|---|---|---|---|
| 1,622,611 | 3/1927 | Sera | 280/47.37 R X |
| 3,224,790 | 12/1965 | Holstein | 280/47.37 R |
| 3,243,196 | 3/1966 | Amis | 280/47.37 R |
| 3,357,716 | 12/1967 | Musichuk | 280/47.37 R |

Primary Examiner—David Schonberg
Assistant Examiner—Michael J. Forman
Attorney, Agent, or Firm—Arthur J. Hansmann

[57] ABSTRACT

A rotary lawn mower including a mower housing and ground supporting wheels at the front and rear of the housing. A mower handle is pivotally mounted at the rear end of the housing but forwardly of the plane of the rear wheels. A support strap is pivotal on the mower housing and rearwardly of the pivot point of attachment of the handle to the mower housing, and the strap extends upwardly to the handle and is connected thereto through a pin which engages selected openings in the handle for selected angulation of the handle relative to the mower housing. The support piece or strap is therefore placed under compression when the operator presses downwardly on the hand grip end of the handle, and thus tipping control or steering control of the mower is readily accomplished. A spring extends between the strap and the mower for urging the strap into support position with the handle, but also the spring releases the strap for ready positioning of the strap in selected angulated positions of the handle relative to the mower.

4 Claims, 8 Drawing Figures

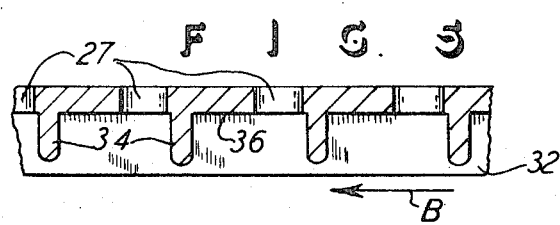
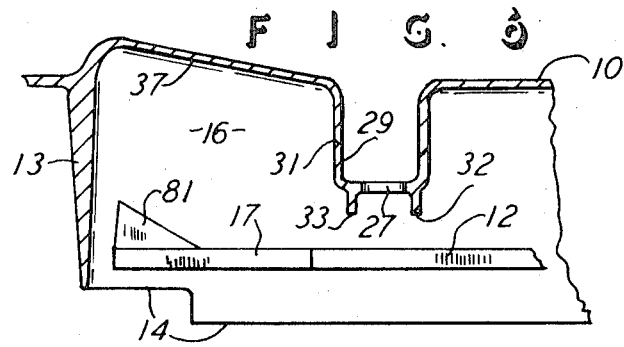
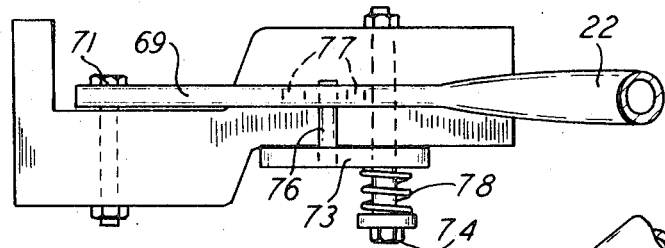
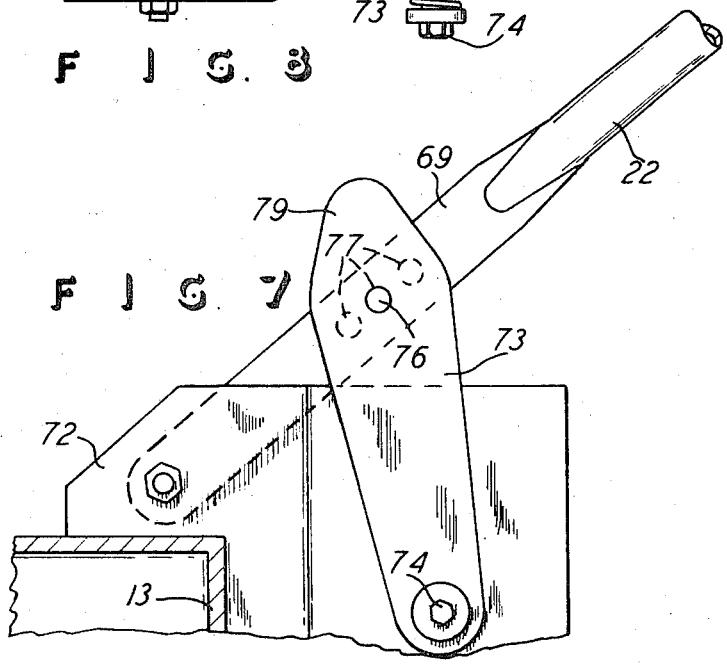

LAWN MOWER HANDLE MOUNTING

This invention relates to a lawn mower handle mounting, and, more particularly, it relates to a handle mounting for a rotary type lawn mower wherein the handle is pivotal on the mower housing.

BACKGROUND OF THE INVENTION

Rotary mowers with pivotal handles are well-known in the art. The handles commonly are U-shaped and have their forward lower ends pivoted to the mover housing such that the operator can steer and tip the mover housing, as he desires in the maneuvering of the mower.

However, the mower handle connections heretofore known are not generally arranged for the most effective and efficient control of the mower, from the standpoint of optimum point of efficient connection of the handle to the mower, nor from the standpoint of optimum arrangement for angulation of the handle to the mover in selective set positions. Accordingly, the present invention provides for the optimum positioning of the pivot connection of the handle to the mower, and it also provides for the optimum selectivity of the angulation of the handle relative to the mower. In accomplishing these objectives, the handle mounting of the present invention is arranged so that the handle is pivotally connected to the mower at the point in advance of the upright plane of the rear wheels of the mower, and thus the maximum efficiency is achieved in forcing on the handle for steering or propelling the mower, and, the present invention provides for an upstanding strap which is pivoted on the mower and which selectively connects to the handle for setting the angulation of the handle relative to the mower. The strap or standard is positioned so that it provides for optimum effectiveness in the tipping of the front end of the mower when the operator so desires and when he presses downwardly on the handle.

Further, the present invention provides for a handle mounting which permits easy and rapid re-adjustment of the selected position of the angulation of the handle relative to the mower housing, and, in accomplishing this, the selected position is also securely maintained, without any effort or manipulation on the part of the operator. Further, the handle mounting of this invention provides for easy release of the selected position of the handle so that the handle can be collapsed or folded relative to the mower, and no tools or special manipulation or skills are required for any of these functions.

Still further, the handle mounting of this invention is arranged so that the operator can force on the handle and achieve maximum efficiency in propelling the mower forwardly, rather than in pushing downwardly on the mower support wheels and thereby only be creating a force component into the ground.

Other objects and advantages will become apparent upon reading the following description in light of the accompanying drawings.

BRIEF DESCRIPTION OF THE DRAWINGS

FIG. 3 is a side elevational view of FIG. 1, with parts removed, and with the engine added thereto.

FIGS. 4, 5 and 6 are enlarged sectional views taken respectively along the lines 4—4, 5—5, and 6—6 of the mower deck of FIG. 1.

FIG. 7 is an enlarged sectional view taken along the lines 7—7 of FIG. 1.

FIG. 8 is a top plan view of FIG. 7.

DETAILED DESCRIPTION OF THE PREFERRED EMBODIMENT

Figure 1:
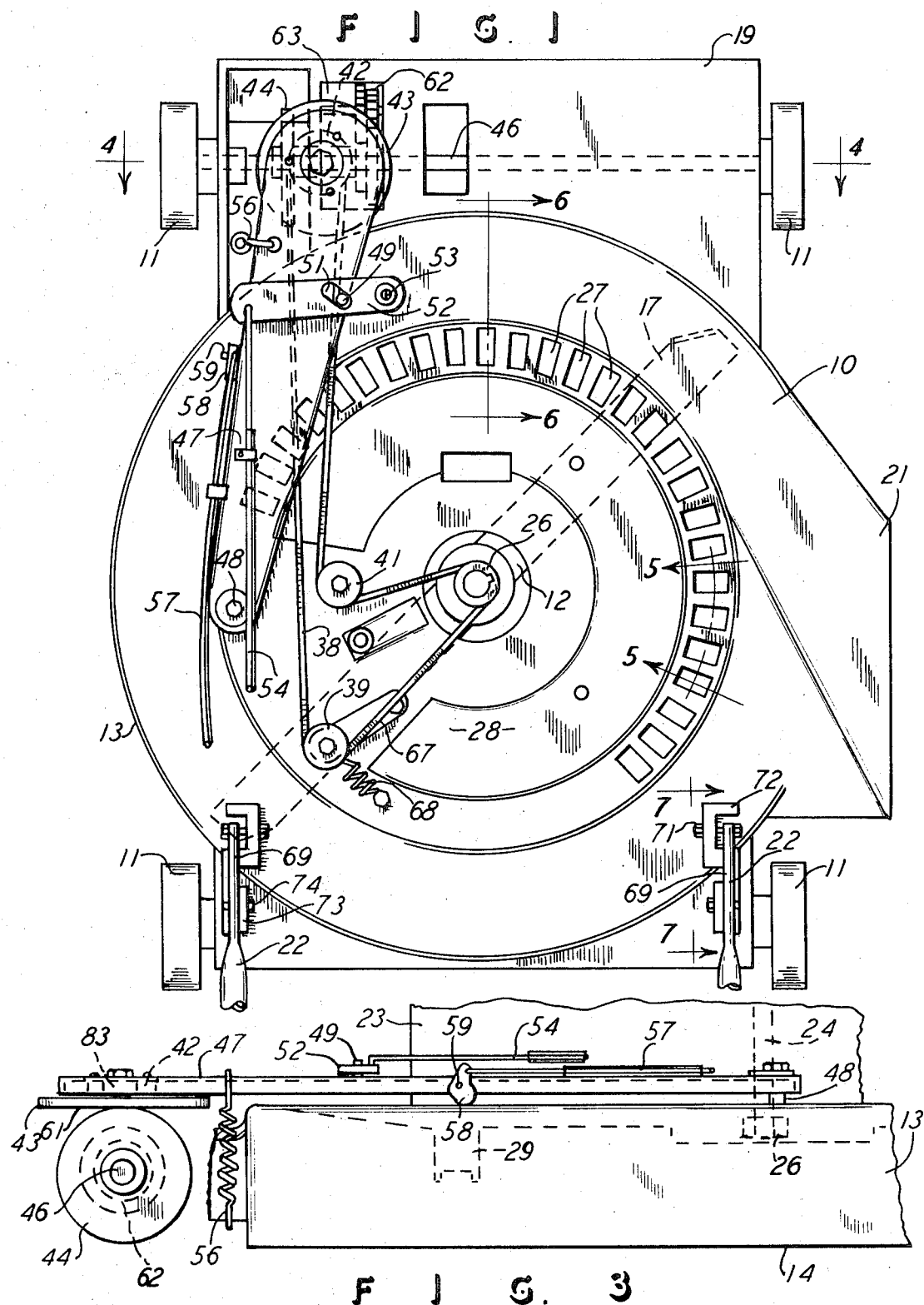
FIG. 1 is a top plan view of a mower showing a preferred embodiment of this invention.
Figure 2:
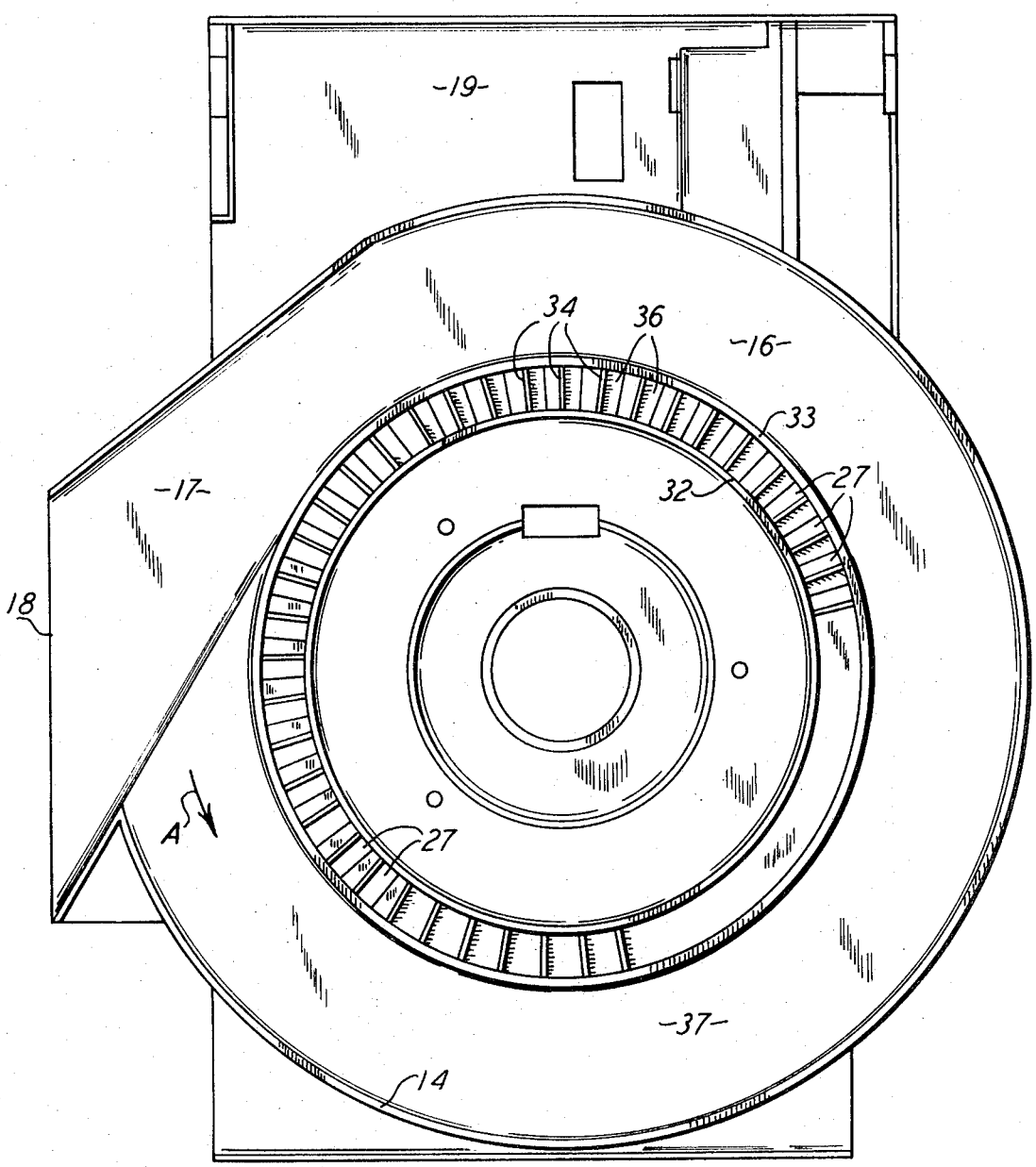
FIG. 2 is a bottom plan view of FIG. 1, with parts removed.

The drawings show a rotary lawn mower having a housing 10 and the usual ground supporting wheels 11. FIGS. 1 and 2 show the top and bottom views, respectively, of the housing 10 which is shown to be generally circularly shaped for enclosing the lawn cutter bar 12 which is rotatably mounted in the housing 10 in the usual manner. The housing 10 has its usual depending skirt portion 13 at the circumference of the circularly shaped housing, and the skirt 13 terminates in its usual lower edge 14 which is disposed immediately above the ground on a horizontal plane, such as also seen in FIG. 3. That is, the wheels 11 are customarily arranged for mobile support of the housing 10 and for positioning the housing depending edge 14 immediately above the ground and in physical contact with the grass being mowed. Thus, the grass blades actually extend up to and above the level of the housing edge 14, in the normal use of the rotary mower.

The drawings further show that the housing 10 has an annulus 16 through which the grass cutting ends 17 of the cutter bar 12 are rotated, for cuttng the grass in the usual manner. Also, the housing 10 has its usual tangentially extending outlet 17 which extends off the circular annulus 16 for directing the cut grass rearwardly and to the side of the forward advancing mower. Of course the cut grass may be directed into a grass catcher bag which is not shown but which is in common use today and which would be mounted on the mower outlet 18. Thus, as seen in FIG. 2, the cutter bar 12 would rotate to have its cutting ends 17 moving in the path and direction of the arrow designated A in FIG. 2, and this is also as seen and indicated in FIG. 6 where the cutter 12 is somewhat re-positioned relative to its shown position in FIG. 1.

Thus, the mower, being supported by the wheels 11 on the ground, is moved forwardly, as seen in FIG. 1, so that the mower has a front end 19, and the cut grass moves out the mower discharge chute 21 which is directed to the right side and rearwardly. FIG. 1 also shows a fragment of the mower handle 22 which is of a well-known construction and which is attached to the mower housing 10 in a manner described later. The operator therefore directs and guides the mower in the forward direction and the cutter bar 12 rotates in the clockwise direction, as seen in FIG. 1, and the cut grass is blown around the mower housing and along the annulus 16 and through the outlet 21, by virtue of the air and physical force imparted by the rotation of the cutter bar 12, all in the usual manner. The usual prime mover 23, and it may be a gasoline engine or an electric motor, is suitably mounted on the mower housing 10 and extends thereabove and has a drive shaft 24 extending downwardly to engage the cutter bar 12 for rotating the bar 12. The bar 12 is shown to have a hub 26 affixed thereto for receiving and keying with the drive shaft 24, all in the usual manner.

The important feature with respect to the mower deck or housing 10 is the provision of air vents which permit the inlet of air into the housing 10 for the purpose of providing the necessary air flow in the movement of the cut grass in the annulus 16 and through the mower outlet 21. To this end, the mower housing 10 is provided with a plurality of air vents or openings 27 which are disposed in the mower housing top 28 and which are shown to be disposed in a circular pattern extending for slightly more than one half the complete circular configuration of the mower top 28 at a location radially inwardly from the cutting annulus 16. With this arrangement, air is permitted to enter the mower housing 10 at the top of the housing 10 and to create a flow of air radially outwardly and into the annulus 16 and therealong at the location where the cut grass is being impelled and directed for exhausting it from the mower housing 10. Thus the vents 27 are located on a semicircular pattern and are disposed adjacent the mower outlet 21 and toward the front end of the housing 10, where the cutter bar 12 is doing the majority of the grass cutting and where it is imparting the air flow for the conveyance of the grass out of the housing 10.

The drawings further show that the housing 10 is provided with a circular section 29 which is depressed in the mower top 28 and which defines the radially inner wall 31 locating the annulus 16. Also, circular ribs 32 and 33 define the section 29 and extend therealong and flank the vents 27, as seen in FIGS. 2 and 6.

FIG. 5 shows the sectional view taken along the section 29 and across several of the vents 27, and it also shows the arrow B which indicates the direction of movement of the cutter bar cutting ends 17. Further, FIG. 5 shows webs 34 depending in the section 29 and as a portion of the housing 10, and there is a web 34 disposed immediately adjacent each vent 27, as seen in FIG. 5. With this arangement, the cut grass is moving substantially in the direction of the arrow B, but, the grass cannot readily reach the vents 27, to clog the vents 27, because of the relative positions of the vents 27 and the webs 34. That is, the webs 34 prevent the cut grass from being blown and thrown into the vents 27. Further, the webs 34 serve to create a Venturi action so that the air will flow downwardly through the vents 27 and into the housing 10 and into the annulus 16, as desired. Thus, the mower housing has the portions 36 which are solid portions and which, along with the webs 34, provide the necessary structural strength for the mower top 28, and the portions 36 are extending to the upstream side of the webs 34 while the vents 27 are immediately adjacent the webs 34 on the downstream side thereof.

The vents 27 are therefore available for the inlet of air at least under circumstances where the mower is operating in thick or heavy grass which tends to block the passage of air into the housing 10 at the location of the mower apron lower edge 14. Especially under those conditions of mowing, ample air cannot flow into the annulus 16 for conveying the clippings through the mower outlet 21, and the mower actually suffocates. With the vents 27, air can flow downwardly into the mower housing 10 and outwardly into the annulus 16, and the air can then adequately move in the annulus 16 to convey the clippings, as preferred and desired.

Of course the provision of the vents in the housing 10, as shown and described, can be utilized with rotary mowers having various configurations and locations of discharge openings or chutes somewhat different from the one shown and described herein. Also, it will be understood that prior art rotary mowers commonly draw air in only from underneath the deck or housing 10, but the vented mower disclosed herein permits the air to come from both underneath and above, and this produces an efficient grass blade agitating action and results in an improved smoother and more even cut and in highly compact bagging action when the cut grass is blown into a collector bag. Still further, the air vents described herein help prevent clogging or packing of grass underneath the mower housing and all of the incoming flow of air is not upwardly underneath the mower housing surface 37 but is also coming through the vents and downwardly into the annulus 16 and radially outwardly into the annulus 16.

Further, the drawings show that the vents 27 are located diametrically opposite the outlet opening 18 and extend around to a location adjacent the opening 18 and slightly therebeyond. The remainder of the housing 10 does not have the vents 27, so the housing strength is provided, and the maximum air flow is induced in the mower housing at the location immediately prior to the tangential discharge designated 17. Further, the total area of the vents 27 occupies a significant portion of the overall area of the housing 10, and, for example, the vents 27 are approximately one-fortieth of the area of the bottom of the housing or deck 10, as shown in these drawings. Also, the total area of the vents 27 is approximately one-fourth of the outlet area 18, as shown in these drawings.

The vents 27 are also disposed on the circular path coaxial with the cutter bar 12, but are arranged in size and spacing, and with the rings 32 and 33 and the webs 34 so that one cannot inadvertently insert a finger into the path of the cutter ends 17 of the bar 12. The cutter ends 17 sweep a path substantially defining the aforementioned area of the bottom of the deck 10, and such area would be that seen or projected area of FIG. 2.

The rotary mower shown is of the self-propelled or powered propelled type wherein the wheels are driven for mobilizing the mower. Thus, the front two of the four wheels 11 are powered through the engine 23 and by means of a drive belt 38 extending around the hub 26 and two pulleys 39 and 41 and up to a pulley 42 at the front of the mower. A drive disc 43 is rotatably connected with the pulley 42 so that the two rotate together. A driven wheel 44 is on a shaft 46 which is rotatably supported on the front of the mower to be driven by the rotation of the wheel 44. In turn, and through any well-known or conventional arrangement, the front wheels 11 are rotatably driven in response to the rotation of the shaft 46. With this arrangement, operation of the engine 23 powers the belt 38 to rotate the disc 43 and drive the wheel 44 and in turn rotate the shaft 46 and drive the mower ground wheels 11. Of course the wheels 11 may be driven through the usual and well-known cammed gear which engages a ring gear in the wheels 11 for rotating the front wheels 11. Such arrangement of the drive gears for the wheels are conventional and need not be described herein.

FIGS. 1 and 3 show that the drive disc 43 is rotatably supported on an arm 47 which is pivotally mounted on the housing 10 by means of a bolt or pin 48. Thus the arm 47 can pivot across the top of the mower housing 10 and thereby move the disc 43 to different locations relative to the upright plane of the driven wheel 44. It will then be understood that the speed of rotation of the wheel 44 will very according to the position of the drive disc 43 in contact with the wheel 44.

The arm 47 has an upstanding pin 49 which engages a slot 51 in an arm 52 pivoted on the mower housing 10 by means of a screw 53. An operator's control 54, which may be in the form of a Bowden wire, connects at its forward end to the pivot arm 52, and the rear end of the control 54 would extend back to the hand grip portion of the handle 22, in the usual and customary manner though the full extent of the control 54 is not shown in these drawings. Thus the operator can manipulate the control 54 and thereby pivot the arm 52 which in turn moves the pin 49 and thus pivots the arm 47 so that the disc 43 would engage the wheel 44 at different points of radial contact on the disc 43. Thereby, the drive speed between the disc 43 and the wheel 44 can be varied. Also, a tension spring 56 connects to the arm 47 and extends down to be anchored on the forward deck 19 of the mower housing, and thus the spring 56 holds the arm 47 and the disc 43 downwardly for drive engagement with the wheel 44. A second control extends back to the handle 22 and includes another Bowden wire 57 which connects to a cam 58 pivoted on the side of the arm 47 by means of the pin 59. Thus rotation of the cam 58 by manipulation of the control 57 will cause the cam 58 to bear downwardly on the mower top surface and thus lift the arm 47 so that the disc 43 is clear of the wheel 44 and thereby the drive to the front wheels is disconnected. As such, the cam 58 and its arrangement with the arm 47 serves as a clutch.

The disc 43 has a rubber face 61 which engages the wheel 44 which is preferably of a hard material, such as a metal. Then, if the wheels 11 were held against rotation, such as by a stalling of the propelling of the mower, then the only thing that would occur would be the slight wearing of the rubber face 61 over the stationary wheel 44. Conversely, if the wheel 44 were rubber faced and stalling occurred, then the wheel 44 would have a flat spot worn onto it when the disc 43 would continue to rotate over the stalled wheel 44, and that would be undesirable in that a thumping would result when normal rotation resumed between the disc 43 and wheel 44.

Figure 4:
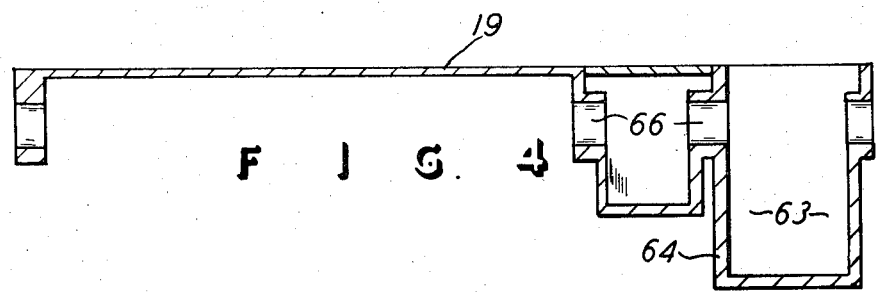

Still further, it will be seen that the actual drive between the wheel 44 and the shaft 46 is through a set of gears 62 which are disposed in a pocket 63 formed right in the mower front portion 19. Thus the wheel 44 is normally and conventionally in rotational drive relation with a gear connected with the wheel 44, and, in turn, other gears in the gear cluster 62 are then rotated until ultimately the shaft 46 is rotated thru the gear train shown. In this manner, a controlled speed reduction is achieved in the speed of rotation of the driving disc 43, and also the mower portion 19 itself presents the gear box 64 which defines the gear cavity 63. The box 64 is cast into and as a part of the mower housing, and FIG. 4 shows the arrangement across the front of the mower, including the openings 66 which receive the bearings for supporting the shaft 46. Therefore, no separate and appended gear box need be provided, and the entire mower is arranged with the integral gear box and therefore a compact, lightweight, and sturdy mower housing is provided.

That is, while the propelling drive goes through the disc 43 and wheel 44 and to the shaft 46, it is transmitted through the gear cluster 62, as described and shown. Also, the driving member is the disc 43 with the rubber face, rather than having the rubber face on the driven wheel 44, for the purpose mentioned. A belt tightener is provided in the form of a pivotal arm 67 which swings the belt pulley 39, and the arm 67 is under the influence of a tension spring 68, as seen in FIG. 1. Further, the belt 38 can be removed from the mower without removing the engine 23, simply by disconnecting the hub 26 from the engine shaft 24 and then sliding the belt 38 across the top of the mower housing 10 and toward the pulleys 39 and 41.

As previously mentioned, the mower handle 22 is only fragmentarily shown, but it would be understood that it is U-shaped and extends rearwardly to the usual hand grip portion where the operator can control the movement of the mower. The forward ends 69 of the legs of the handle 22 are pivotally connected to the mower by means of pins or bolts 71 supported on upstanding mower housing projections 72. In order to establish the desired angle or elevation for the handle 22, a standard 73 is pivotally supported on the mower projection 72 by means of a bolt or pin 74. The upper end of the standard or support 73 carries a pin 76 which extends into one of three openings 77 on the mower handle end 69. Thus the upper end of the standard 73 and its pin 76 can be withdrawn from any one of the handle hole 77 and then re-inserted into another one of the holes 77 and thereby alter the angulation of the handle 22 relative to the mower housing 10. A compression coil spring 78 abuts the side of the standard 73 to yieldingly maintain the pin 76 in the selected one of the handle holes 77. It will also be seen that each of the legs of the handle 22 has a standard 73 with its attached pin 76, for the purpose just mentioned.

With this arrangement, the standard upper end 79 is extended above the handle end 69 and is therefore available for removing the pin 76 from one of the handle holes 77, without the requirement of any tools or any special skill or manipulation in re-positioning the pin 76. Also, it will be seen and understood that the handle 22 could be of the well-known folding type such as that shown in U.S. Pat. No. 2,727,753 where the handle folds downwardly to encircle the engine, and, in the present instance, there is nothing on the handle to interfere with the folding action, and the interengaging pin is on the standard 73, rather than having it on the handle. Further, the handle pin or bolt 71 is forward of the rear wheels 11, and thus any pushing by the operator on the handle 22 will be efficiently transmitted to the mower housing 10 at the point forward of the rear wheels 11, rather than having the pushing action force the rear wheels downwardly into the ground or even tip the rear end of the mower down. That is, the standards 73 serve to securely angulate the handles relative to the mower, and, at the same time, the handles can be readily released from the standard 73 for either re-positioning the angulation or for folding the handle, and also the handle is disposed for maximum efficiency and the pushing action on the mower 10. Also, when the operator forces downwardly on the hand grip portion of the handle 22, then the standard 73 is simply placed under compression and is not weakened or damaged by such compressive force nor is it released from its support for the handle 22, which might be the occurrences if the pivot points between the handle and the standard were reversed such that the standard would be placed in tension when the handle is pressed downwardly.

With regard to arm 47, it will be noted that its pivot mounting 48 is halfway back on the housing 10 and this places it approximately halfway between the front and rear wheels 11. It also places the mounting 48 adjacent the pulleys 39 and 41. Therefore, the arm 47 has a large pivot radius, and, upon swinging the arm 47 for changing the speeds of the mower, the belt 38 does not lose its tension since one extent of the belt 38 from the pulley 39 to the pulley 42 would either become more slack or have more tension, but, by virtue of the positioning of the pulleys 39 and 41, the belt 38 in its extent from the pulley 41 to the pulley 42 would accommodate the increased tension or slackness. Also, there is the belt tightener 68 effective on the tightener arm 67 for holding the belt 38 in tight condition.

The arm 52 has its slot 51 adjacent the pivot mounting 53 for the arm 52, and thus leverage is obtained in the actuation of the arm 52 and the consequent pivoting of the arm 47, so that the arm 47 can be easily moved when movement is desired. Further, the face 61 is of a resilient material, and it thus provides the necessary frictional contact with the circumference of the drive wheel 44, as mentioned. Further, the cam 58 is a clutch member which provides for disengagement of the drive disc 43 from the drive wheel 44. Also, the control 54 extends back to the hand grip portion of the handle 22, and it preferably has selectable positions for setting the control 54, and thus setting the arm 52 and arm 47, in selected and fixed positions for holding the desired drive speed. U.S. Pat. No. 3,334,429 shows a type of disc and wheel drive, and it also shows controls extending from the drive and back to the operator's handle, and these controls can be set in desired positions and retained therein, such as is commonly known by use of a lever and detents and such as shown in the said patent.

With regard to the air vent openings 27, it will be noted that the housing portion or section 29 is depressed in a circular pattern, and the openings 27 are in the lower portion of the depressed section 29 and thus are immediately adjacent the blade 12. Also, the vents 27 are then located in the forward portion of the mower housing 10, and the rearward portion is free of any vents, and such rearward portion extends for up to one-half the circular rear portion of the mower, as shown in FIG. 1. The vents 27 then extend from immediately adjacent the tangential chute 17 and the outlet 18 to the diametrically opposite side of the housing and underneath the speed control arm 47.

Also, the area of the vent openings 27 is such that the dimension of the vents along the line between each other is shown to be between one-half and one-third of the spacing or distance between every two openings 27, for ample air inlet opening and for adequate strength in the mower housing.

Further, the blade 12 has its ends 17 provided with the fanning portion or blade 81 which creates the air flow described. The fanning blades 81 draw the air into the cutting chamber 16, both from underneath the mower and through the openings 27, and the blades 81 also cause the air to move through the tangential outlet 17 and exhaust outlet 18.

With regard to the driving disc 43, it is supported on a bearing 83 which is mounted on the arm 47, and the pulley 42 is also suported with the bearing 83. That is, the pulley 42 and the disc 43 are rotatably mounted on the arm 47 and they move with the swinging of the arm 47 about the pivot bolt 48. Also, the pivot bolt mounting 48 permits the up and down movement of the arm 47 under the influence of the cam 58 for engagement and disengagement of the disc 43 relative to the driven wheel 44. Further, it will be understood that a protective stationary cover is commonly provided over the entire arm 47 and the pulleys 39 and 41, but such cover is not shown herein so that the moving parts can be more fully shown and described.

U.S. Pat. No. 3,462,924 also shows a U-shaped handle which is foldable over the mower engine, and it further shows a Bowden wire extending to a control at the handgrip end of the mower handle, and such arrangement could be used in this instance for controlling the clutch element described. Further, it will be seen that the pivot mountings for the handle 22 and the standard 73, namely the pins or bolts 71 and 74, and the point of intersection between the handle 22 and the standard 73, which is at the pin 76, form an equilateral triangle at least substantially so. With this arrangement the force on the handle is countered by compression in the standard 73, and the handle force is efficiently transmitted for either tipping the mower up off its propelling front wheels 11 or for pushing the mower in a forward direction. The standard 73 is yieldably urged to have its pin 76 enter one of the sockets or openings 77 by the urging of the compression spring 78.

What is claimed is:

1. A lawn mower handle mounting comprising a mower housing, front and rear ground wheels rotatably mounted on said housing, a mower handle pivotally mounted on said housing at a location intermediate said front and rear wheels and extending rearwardly and upwardly from said mower housing, a pivot pin and a standard mounted on said housing beneath said handle and toward said rear wheels, relative to said location of pivot of said handle on said housing, and with said standard being pivotal on said pivot pin and extending upwardly from said housing to intersect with said handle by extending past the side of said handle and with the longitudinal axis of said pivot pin being disposed parallel to the pivot axis of said handle, pin and opening means on the upper end of said standard and on said handle at the intersection therebetween for releasable supporting engagement to upwardly support said handle, said means including a plurality of openings for selective engagement by the pin of said means, for selective angulation of said handle relative to said housing, and with said pin and said opening means having their axes disposed parallel to the pivot axis of said handle, and a compression spring disposed on said pivot pin and in abutment with said standard to urge said standard toward said handle for inter-engagement of said pin and opening means.

2. A lawn mower handle mounting as claimed in claim 1, wherein said standard projects above said handle from the intersection therebetween, and with the upper projecting end of said standard being available for manipulation in releasing said pin and opening means in altering the angulation of said handle with said housing.

3. A lawn mower handle mounting as claimed in claim 1, wherein said front wheels are powered wheels for propelling said mover, and said rear wheels are freely rotatable mounted and serve as ground pivot points in tipping said housing to raise said front wheels off the ground, said standard being disposed relative to said handle to be placed in compression during the tipping action.

4. A lawn mower handle mounting as claimed in claim 3, wherein the two said pivot axes and the intersection of said handle and said standard form substantially an equilateral triangle.

* * * * *